US011468343B2

(12) United States Patent
Kulkarni et al.

(10) Patent No.: US 11,468,343 B2
(45) Date of Patent: Oct. 11, 2022

(54) METHOD AND SYSTEM FOR A USER-SPECIFIC COGNITIVE UNIT THAT ENHANCES GENERIC RECOMMENDATION SYSTEMS

(71) Applicant: Dialpad UK Limited, London (GB)

(72) Inventors: Ritwik Kulkarni, London (GB); Ozgun Tandiroglu, London (GB); Michele Sama, London (GB); Tim Porter, London (GB)

(73) Assignee: DIALPAD UK LIMITED, London (GB)

( * ) Notice: Subject to any disclaimer, the term of this patent is extended or adjusted under 35 U.S.C. 154(b) by 1109 days.

(21) Appl. No.: 15/970,877

(22) Filed: May 4, 2018

(65) Prior Publication Data

US 2018/0322402 A1 Nov. 8, 2018

Related U.S. Application Data

(60) Provisional application No. 62/500,838, filed on May 3, 2017.

(51) Int. Cl.
*G06F 11/34* (2006.01)
*G06N 5/04* (2006.01)
(Continued)

(52) U.S. Cl.
CPC .............. *G06N 5/04* (2013.01); *G06F 9/451* (2018.02); *G06F 9/461* (2013.01);
(Continued)

(58) Field of Classification Search
CPC ........................................................ G06N 5/04
See application file for complete search history.

(56) References Cited

U.S. PATENT DOCUMENTS

| 2012/0191631 | A1* | 7/2012 | Breckenridge | ........ | G06N 20/00 |
| | | | | | 706/12 |
| 2014/0157171 | A1* | 6/2014 | Brust | .................. | G06F 3/04842 |
| | | | | | 715/771 |

(Continued)

OTHER PUBLICATIONS

Blei, David M. et al., "Latent Dirichlet allocation," Journal of Machine Learning Research 3: (Jan. 2003) 993-1022. doi:10.1162/jmlr.2003.3.4-5.993.

(Continued)

*Primary Examiner* — Di Xiao
(74) *Attorney, Agent, or Firm* — Patent Law Works LLP

(57) ABSTRACT

A method and system are disclosed for a novel architecture in which competing suggestions, possibly generated by competing systems, are selected by a Cognitive Unit (CU). The CU observes the user context and learns which contextual circumstances affect the user's cognitive behaviour. Majority of the traditional models trained over multiple users fail to represent the individual because (1) they ignore personal bias toward certain decisions and (2) they don't have complete visibility of all options available to users (i.e. from competitive systems). The invention is ideally suited to interact with several other products as more and more modern products are using AIs to drive the user experience. That shifts traditional HCI towards a novel form of interaction that we call human-AI interaction (HAII). When applied to user experience, predictive models make decisions on users' behalf attempting to minimise user interaction while guiding them toward the completion of predefined funnels. This invention presents a novel approach using a personal model capable of partially replicating cognitive behaviours by learning personal situational biases using the CU. By leveraging the personal biases, the system allows the AI to learn situational biases otherwise not available to predictive models. Once trained cognitive unit can supplement the decision-making process of the user.

12 Claims, 4 Drawing Sheets

(51) Int. Cl.
    *G06N 5/02*         (2006.01)
    *G06F 9/46*         (2006.01)
    *G06F 9/451*       (2018.01)
    *G06N 20/00*      (2019.01)
    *G06N 3/00*         (2006.01)

(52) U.S. Cl.
    CPC ......... *G06F 11/3438* (2013.01); *G06N 3/006* (2013.01); *G06N 5/022* (2013.01); *G06N 20/00* (2019.01)

(56) References Cited

U.S. PATENT DOCUMENTS

| | | | |
|---|---|---|---|
| 2016/0132198 A1* | 5/2016 | Sinclair | G06Q 50/01 715/739 |
| 2017/0105048 A1* | 4/2017 | Stein | G06F 3/0482 |
| 2017/0161624 A1 | 6/2017 | Porter et al. | |
| 2018/0060793 A1 | 3/2018 | Sama et al. | |
| 2018/0077100 A1 | 3/2018 | Sama et al. | |
| 2018/0150768 A1 | 5/2018 | Togia et al. | |

OTHER PUBLICATIONS

Casali, Ana, et al., 'A Tourism Recommender Agent: from theory to practice,' Intelegencia Artificial, Revista Iberamericana de Intelegencia Artificial, (2008) pp. 23-28, vol. 12, No. 40.

Chang, Angel X. et al., "Sutime: A Library for Recognizing and Normalizing Time Expressions," (2012) 8th International Conference on Language Resources and Evaluation (LREC 2012).

Guidelines for Temporal Expression Annotation for English for TempEval (Aug. 14, 2009). TimeML Working Group.

* cited by examiner

METHOD AND SYSTEM FOR A USER-SPECIFIC COGNITIVE UNIT THAT ENHANCES GENERIC RECOMMENDATION SYSTEMS

The present patent application claims priority from U.S. Provisional Patent Application No. 62/500,838 filed May 3, 2017, which is hereby incorporated by reference.

TECHNICAL FIELD OF THE INVENTION

The technical field of the invention relates to the field of Artificial Intelligence (AI). More specifically, the technical field of the invention relates to a particular area within AI, namely, human-computer interaction (HCI).

BACKGROUND OF THE INVENTION

Prior art Artificial Intelligence (AI) systems lack human-like cognition in the domain of preference selection. The human cognitive process is thought to be comprised of several underlying neural processes involving information transfer across different regions of the brain. The resulting behaviour is regarded as an amalgamation of innate genetically-coded responses and learned responses through experience. Prior art AI systems do not perform well when compared to generic cognitive abilities of human beings and are well away from general intelligence. Prior art AI's are narrow, in the sense that they model and solve a single predefined problem, albeit with high accuracy but with little to no ability to develop an abstract understanding to generalise over varied domains.

Prior art classifier systems, which are designed to label input with a predefined set of classes, make general predictions for an average user. Prior art classifier systems interpret the selected class as a prediction of a user's future behaviour, which is then translated into a predefined effect. For instance, a predictive fraud detection system could decide to block a user's credit card if a recent purchase is classified as "suspicious". The resulting behaviour is "hard-coded" in the product and, after the classification has been made, the user has no control over its effects (e.g. immediately blocking the card), whereas in real life the user would bend the execution to account for other personal needs (e.g. buying groceries or withdrawing cash) before blocking the card. Prior art systems are not capable of recognising this subtle requirement of the user and make necessary amendments to the predictions. Prior art systems ignore minor personal preferences as noise and therefore do not learn about those minor personal preferences and cannot learn to modulate the results of other predictive systems.

What is needed is an AI system that tailors the predictions of generic models to an individual user's preferred behaviour subject to the context. Focusing on personal bias would allow such a system to perceive the cognitive behaviours as a continuous sequence of actions, instead of discrete instances evoked by each trigger. The global model, on the other hand, lacks the continuity aspect of cognition, since the average derived for one stimulus might represent a different group of people, rather than the average of an another one.

SUMMARY OF THE INVENTION

Embodiments of the present invention include a novel architecture in which competing suggestions, possibly generated by competing systems, are selected by a Cognitive Unit (CU). The Cognitive Unit is a computer-implemented personal situational bias model which observes the user context and learns in which contextual circumstances affects the user's cognitive behaviour. The cognitive unit is can correlate contextual information with users' decisions in order to simulate users' cognitive behaviours. The architecture, described in further detail below, assumes that the user experience (UX) would allow users to explicitly or implicitly, teach the system what the desired behaviour should be. The more detailed these feedback signals are, the more information they contain and the better the CU will learn.

The system can interact with multiple other products as more and more modern products are using AIs to drive the user experience. That shifts traditional HCI towards a novel form of interaction: human-AI interaction (HAII). The CU architecture combines human-AI interaction with user biases to further increase prediction accuracy. The HAII functions as an interface, where on one side it has visibility of all the products making suggestions, while on the other side it has visibility over the selection made by the user as well as the context in which the selection was made. With sufficient observations the CU understands why the user made a particular choice.

The CU learns over time either with reinforcement learning, on-line learning, or mini batches. To enable such learning on every selected action, the cognitive unit is fed with a signal including: the original input event, the predicted task, the list of predicted actions with both their global priority and cognitive priority, and the current user's context.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF EMBODIMENTS

Figure 1:
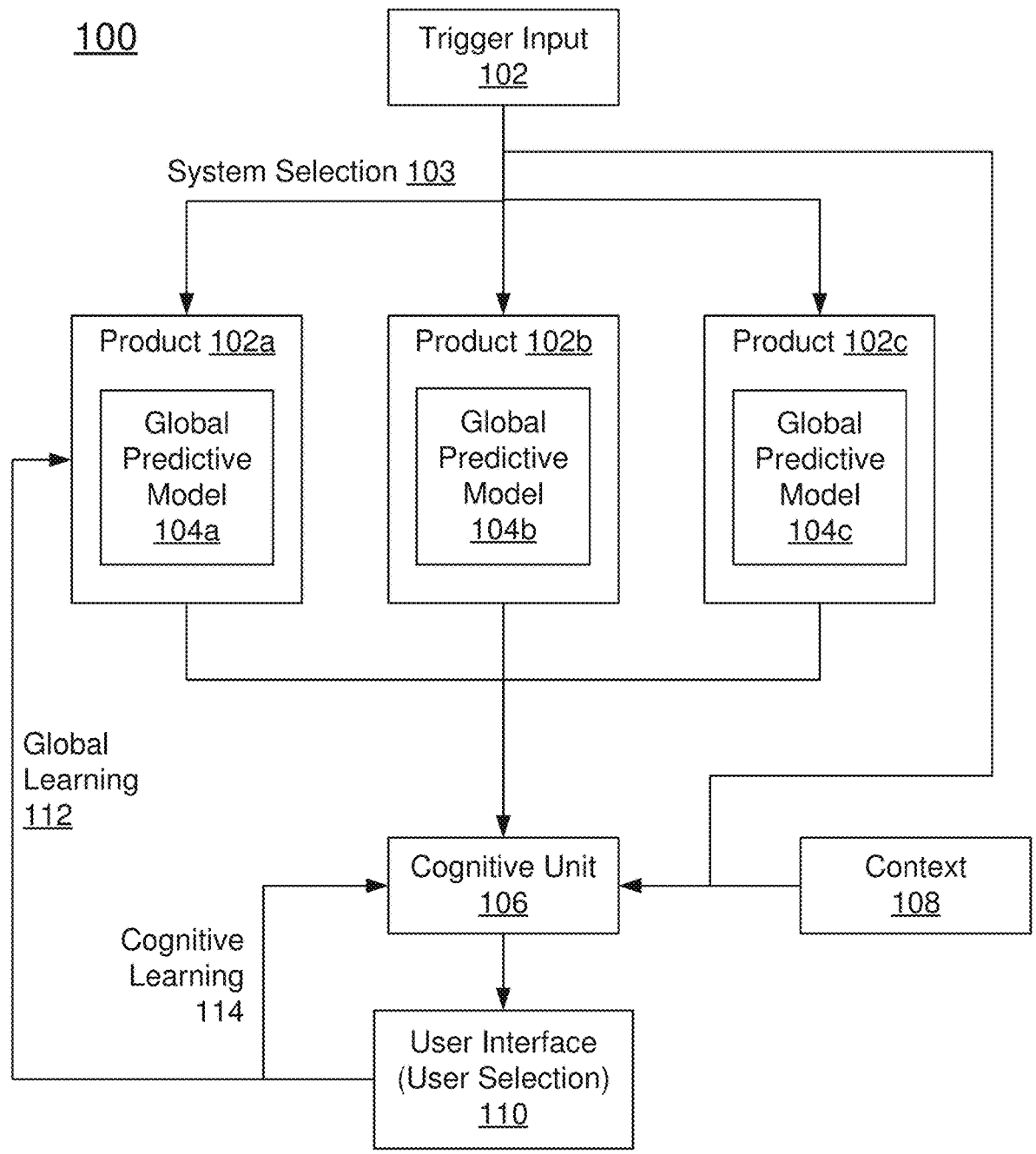
FIG. 1 shows a schematic of an overall system architecture 100 in accordance with embodiments of the present invention.

Embodiments of the present invention are directed to computer-implemented methods and systems the field of Artificial Intelligence (AI), wherein, the main goal is for a computer system to make decisions in a manner similar to a human thus aiding users in their tasks. In other terms, one of the goals is to emulate human level intelligence. More specifically, embodiments of the present invention leverage a particular area within AI, namely, human-computer interaction (HCI). Embodiments of the present invention are directed to a novel extension to HCI by formulating a system for human-AI interaction (HAII). The system can learn the cognitive processing of humans through observation and feedback and applies the acquired knowledge to refine predictions made by other AIs. In other words, through interaction with humans, the system can observe individual biases and use the individual biases to refine or customise AIs' decisions.

Embodiments of the present invention makes progress in that direction where an AI can simulate the results of the cognitive decision-making of a user over different domains. The system can abstract out the neural processes of the human brain with generic learning mechanisms and focus on predicting the results of individual decision making as manifested by the choices made from a given set of available options. In correctly predicting the responses for different individuals, the system can simulate the result of the cognitive reasoning that has been made by an individual. This abstract model implies that an artificial intelligence with enough memory of past stimuli, a detailed representation of external inputs, a good approximation of pre-trained memories and a learning mechanism that can handle complex relations could eventually learn to simulate general intelligence in the domain of task-related decision making.

Embodiments of the present invention go beyond prior art classifier systems by understanding each user's requirements. As stated above, prior art classifiers, which are designed to label input with a predefined set of classes, make general predictions for an average user. Prior art classifier systems interpret the selected class as a prediction of a user's future behaviour, which is then translated into a predefined effect. For instance, a predictive fraud detection system could decide to block a user's credit card if a recent purchase is classified as "suspicious". The resulting behaviour is "hard-coded" in the prior art product and, after the classification has been made, the user has no control over its effects (e.g. immediately blocking the card), whereas in real life the user would bend the execution to account for other personal needs (e.g. buying groceries or withdrawing cash) before blocking the card. A system in accordance with embodiments of the present invention is capable of recognising this subtle requirement of the user and make necessary amendments to the predictions. Rather than ignoring minor personal preferences as noise, the system instead learns about those minor personal preferences and learns to modulate the results of other predictive systems.

Moreover, the system can choose between multiple competitive products. For instance, a user could browse multiple stores before making a purchase. To learn the underlying motivation for an observed cognitive behaviour, the system needs to have visibility of relevant input stimuli and all the options available in reference to a specific user, so that the system can capture a suitable suggestion was not selected because a better one was available.

Thus overall, embodiments of the present invention address the need of a system that tailors the predictions of generic models to an individual user's preferred behaviour subject to the context. Focusing on personal bias allows the invention to perceive the cognitive behaviours as a continuous sequence of actions, instead of discrete instances evoked by each trigger.

An object of the present invention is to achieve a cognitive mapping model which can be replicated and adapted for every user of the system. The model, referred to herein as the "Cognitive Unit" (CU), which can be embodied as computer-readable instructions executing on a computer system, acts as a smart interface between a user and other AI-driven recommendation products. This enables forms of Human-AI interaction wherein the cognitive unit acts on behalf of the user in making choices, learning and adapting by observing the user. Thus, the system generates a model which can represent a user's cognitive process and, because the system can take into account a large class of input variables, the system can be applied to varied domains.

Another object of the present invention is to come close to a general level of "intelligence" that can map out the decision-making process of the user. Because the cognitive unit learns over external features (environmental stimuli) and internal variables (hidden states), the applicability of the cognitive unit crosses domains and it learns over any given set of choices to be selected from.

Moreover, the system can also can learn how personal bias changes according to different contexts and can create context sensitive specific scenarios with different outcomes. For instance, a sales representative might know which leads prefer emails to phone calls and vice versa. The system is also capable of detecting the patterns in the context-dependent behaviour, e.g. the next time the sales representative needs to contact the lead who prefers phone calls, the invention will predict phone call as an action.

An important advantage of the system is that it can receive inputs from multiple independent products and select the most useful suggestion for the user. This reduces interaction times of the users with their devices, and the system acts as a smart personal assistant. Because the system has mapped out the cognitive processes of the user, the choices of the system mimics the choices of the user. Thus, the system helps in automating some decisions for the user. This enables the system to facilitate a novel paradigm of human-AI interaction (HAII).

FIG. 1 shows a schematic of an overall system architecture 100 in accordance with embodiments of the present invention. Cognitive unit 106 uses predictions from third party systems (products 102*a-c*) that compete with each other to suggest the possible next action for the user. Predictions are surfaced on demand (system selection 103) in response to trigger event 102, such as a query. Third-party systems (products 102*a-c*) are invoked selectively only if they can serve the query. Internally, the third party systems (products 102*a-c*) leverage their own global predictive models 104*a-c* and have access to different information. Therefore, third-party systems (products 102*a-c*) can suggest different predictions depending on their purpose. However, third-party systems (products 102*a-c*) are not aware which of the other third-party systems are competing with them in making a recommendation. For example, product 102*a* is not aware that product 102*b* is also making a recommendation on the same trigger event 102. Cognitive unit 106 forms a high-level interface that learns when users interact with the predictions from global predictive models 104*a-c*, and thus is aware of the other competing third-party systems (products 102*a-c*). This model closely represents problems in real life scenarios. Imagine two competing e-commerce websites with similar products. By being only aware of items browsed and purchases from those e-commerce websites, the e-commerce websites are only exposed to a subset of user's behaviour (global learning 112). Cognitive unit 106 overcomes this limitation and is also in a better position to understand a user's cognitive processes (cognitive learning 114).

Architecture 100 exposes cognitive unit 106 to all predictions from global predictive models 104a-c of products 102a-c to gain a better perspective. The most suitable prediction is then proposed to the user via user interface 110. The user can either use the proposed prediction or select an alternative one (user selection). In either case, cognitive unit 106 learns from the acceptance of the proposed prediction or the selection of an alternative and updates its own state. Cognitive unit 106 sorts all predictions by confidence and presents predictions to the user in that order. Even though cognitive unit 106 has access to all possible options, the user's decisions may also be affected by other circumstances including trigger input 102 and context 108 at the time in which the choice was made. To allow cognitive unit 106 to learn cause-effect patterns, cognitive unit 106 is fed with trigger input 102 and the user's context 108. Trigger input 102 can be an event that initiates the query including, but not limited to, receipt of a text message, email, phone call, app selection by the user, other user action or input, etc. Context 102 can be a state associated with the user (or the user's device) at the time the choice was made, including, but not limited to, time of day, location, app that was in use, during a phone call, etc. This allows cognitive unit 106 to model hidden features that are not readily available for observation yet can be modelled as input-output mappings that drive decisions.

For instance, the system can be embodied in a personal predictive To-Do list application, such as the Glum mobile application ("app"), where a user connects preferred data sources, such as email or instant messaging, to the app. Examples of such an app are described in U.S. Patent Application Publication No. 2017/0161624 to Porter et al., U.S. Patent Application Publication No. 2018/0060793 to Sama et al., U.S. Patent Application Publication No. 2018/0060793 to Sama et al., U.S. Patent Application Publication No. 2018/0077100 to Sama et al., and U.S. patent application Ser. No. 15/828,411 to Togia et al., all of which are incorporated by reference into the present application.

Figure 2:
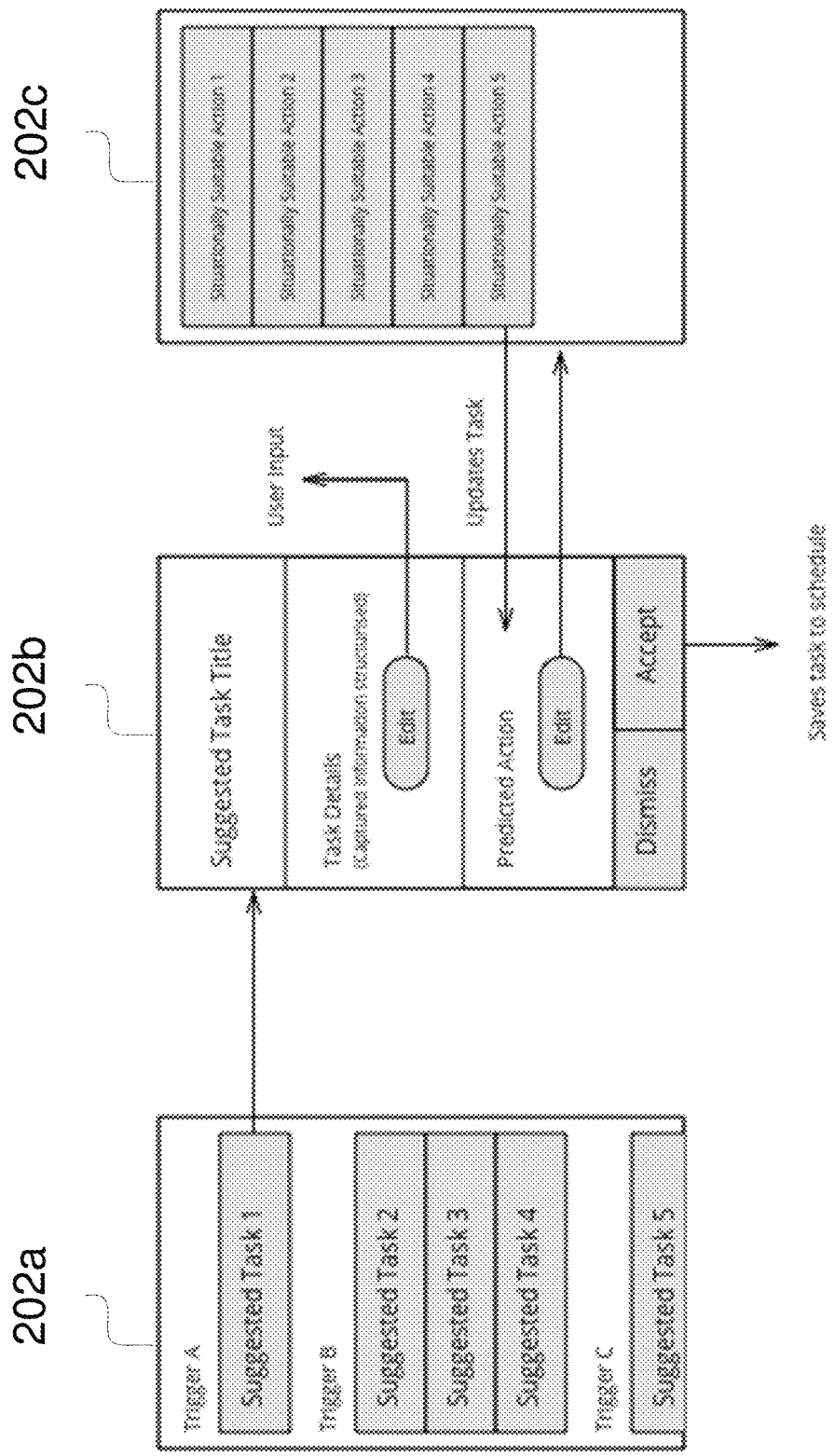
FIG. 2 shows an exemplary user flow in accordance with embodiments of the present invention.

FIG. 2 shows an exemplary user flow in accordance with embodiments of the present invention. The app is preferably designed to capture and track the context 108 along with various trigger inputs 102 from different domains along with corresponding actions (situationally suitable actions 1-5). Cognitive unit 106 will use this information to make predictions, referred to as suggested tasks in the application (suggested tasks 1-5) which will be sorted by the level of their confidence. At 202a, cognitive unit predicts suggested task 1 for trigger A, suggested tasks 2-4 for trigger B, suggested task 5 for trigger C, and so on. If the user selects suggested task 1, then suggested task 1 is opened and displayed in 202b. At 202b, the suggested task title for suggested task 1 is displayed. Task details for suggested task 1 are also displayed. If the task details need manual editing, the user can select the edit button and manually edit the task details. A predicted action associated with suggested task 1 is also displayed to the user. If the predicted action needs to be changed, the user can select the edit button. At 202c, the user is shown situationally suitable actions 1-5 associated with suggested task 1. In this example, the user selects situationally suitable action 5, which replaces the predicted action in 202b. When the user is satisfied with the content of the suggested task, the user can select "accept" to save the task to a schedule in the app or in a connected app. If the user does not want to save the task, the user can select "dismiss".

In this way, the app collects telemetries on executed actions and also allows users to perform alternative actions, therefore receiving direct and explicit feedback for each prediction (suggested tasks 1-5). For example, a user receives an email describing the intention of booking holiday tickets. The app captures that intention along with any relevant information about the time and the destination and creates a task. The app then gathers the situationally suitable actions from available sources, for example, they are multiple booking services connected. The global model of the app will sort the situationally suitable actions by confidence, and the cognitive unit of the app will re-prioritise them. The user interface (UI) will display a selected situationally suitable action to the user and will also display a list of all of the alternatives.

Figure 3:
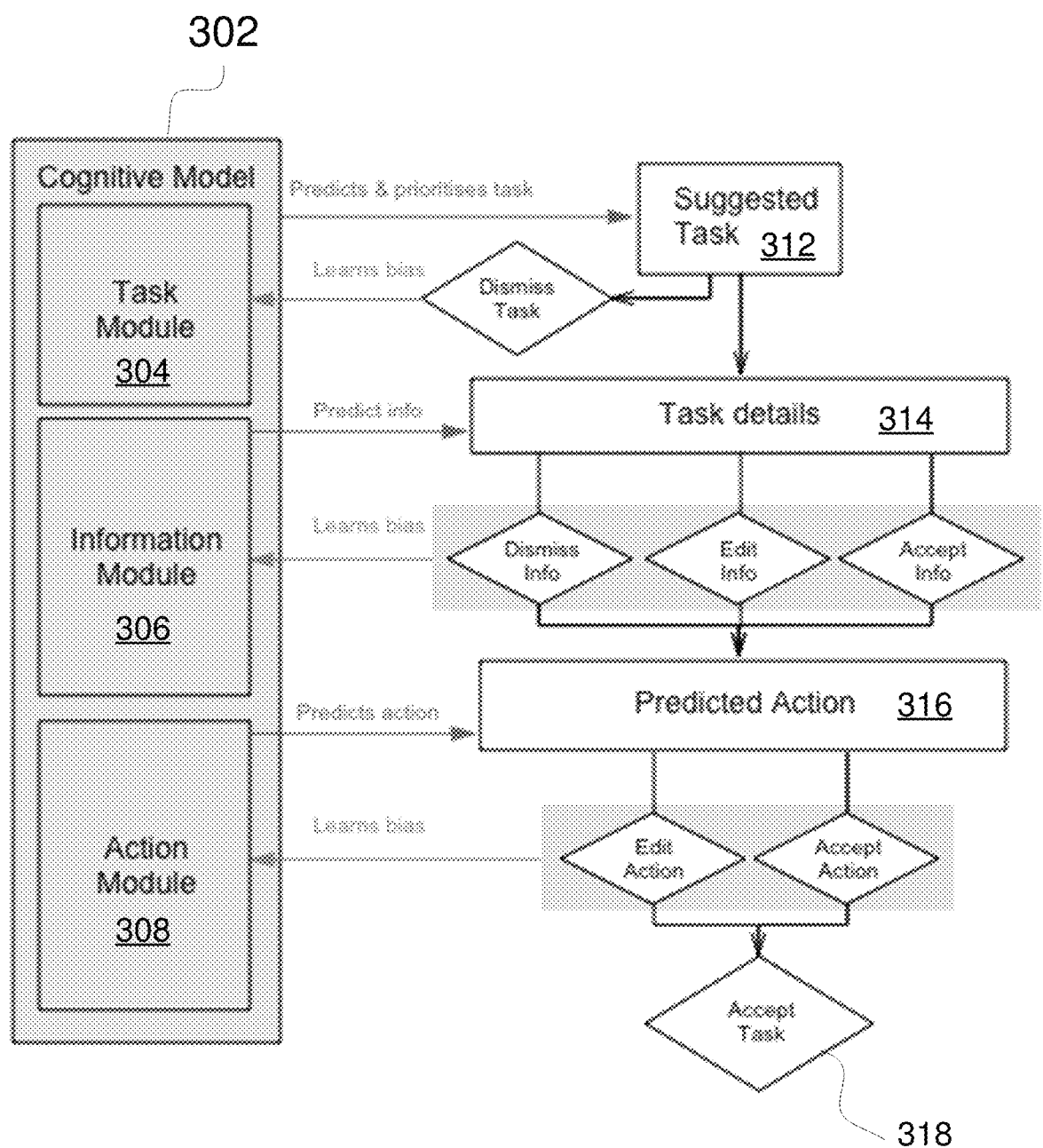
FIG. 3 shows the feedback ritual for an exemplary cognitive unit in accordance with embodiments of the present invention.

Embodiments of the present invention extend the traditional form of Human-Computer Interactions (HCIs), which assume that the user instructs the machine by interacting with a UI. The cognitive unit changes the UX from a traditional HCI to a Human-Artificial Intelligence Interaction (HAII) wherein the global model, in conjunction with the CU, provides suitable executions of tasks while the user is implicitly or explicitly training the CU with personal responses. FIG. 3. lays out the feedback ritual. In terms of UX, suggested task 312 can be considered as a generic Create New Item screen with pre-filled information by CU (task details 314). Task module 304 of cognitive unit 302 predicts and prioritises suggested task 312. Information module 306 of cognitive unit 302 predicts the pre-filled information used in task details 314. Action module 308 of cognitive unit 302 predicts one or more actions (predicted action 316) associated with suggested task 312. The user can accept, dismiss or adjust any part of suggested task 312, task details 314, and predicted action 316. Each time the user accepts, dismisses, or adjusts any part of suggested task 312, task details 314, and predicted action 316, this information is fed back to task module 304, information module 306, action module 308 and the cognitive unit learns the biases of the user. The user is expected to go through the feedback ritual for each task they add to their list.

Cognitive unit 302 is in a unique position to learning a user's cognitive behaviour because: (1) it is fully aware of all competing systems and all the suggestions they make; (2) it knows the user context; (3) it is aware of the variables not visible to the competing systems. Cognitive unit 302 learns the sequence of user's interactions within the situation in which they happen. The situation includes the trigger input, the context, and the list of available options. The pairs $p \in \{system, predictions\}$ are encoded with embeddings. Users interactions are recorded as $a \in \{input, context, [a0 \ldots n], s, t\}$ where $s \in 0 \ldots n$ represents which among the entities was selected and t is time in which it was selected. This formulation assumes that if the user is not happy with the predicted action, then the user would be able to select other predicted actions and that the predicted actions will all be sorted by relevance. Therefore, if the user selects the third predicted action displayed, then cognitive unit 302 learns that the third predicted action should have been more relevant than the first two predicted actions.

Embodiments of the present invention enhance the accuracy of predictive models by observing how cognitive biases affect the decision-making process and by including observed biases in the decision-making process. Embodiments of the present invention bring about a novel and inventive form of interaction, namely, human-AI interaction, where the AI through learning will emulate the decision-making process of the user. Embodiments of the present invention can both learn the biases of single users both individually or by group, depending on how the embodiment is configured. Embodiments of the present invention can enhance the decision-making process across suggestions proposed by from varying or even competing components, thus further helping the users in managing their tasks. Embodiments of the present invention learn over multiple external sources, latent variables, and contexts. Embodiments will then apply this learning to any multiple-choice situation. Thus, embodiments are domain general and wide in their applicability across products.

Figure 4:
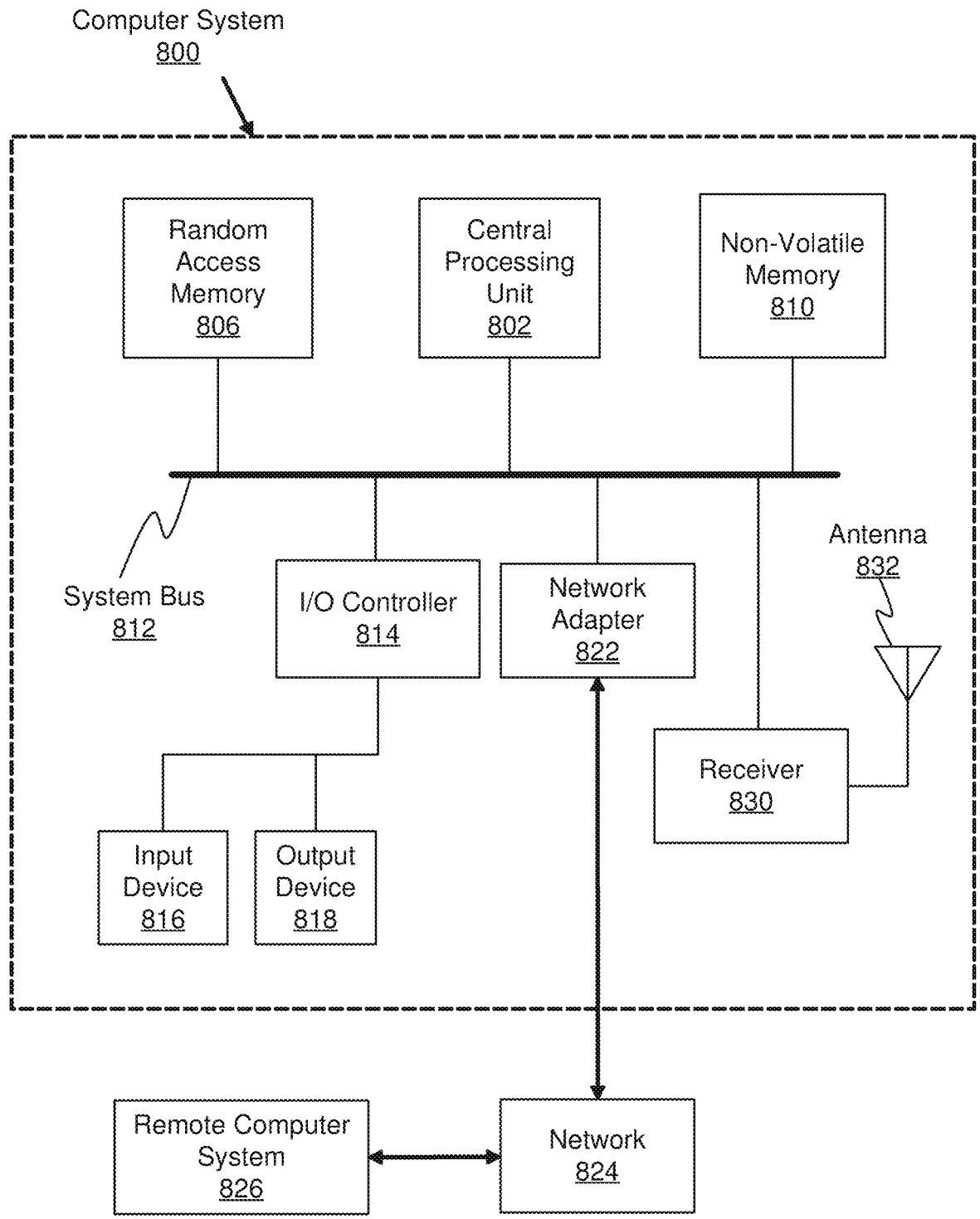
FIG. 4 is a block diagram showing a computer system 800 suitable for storing and/or executing a computer program in accordance with embodiments of the present invention.

FIG. 4 is a block diagram showing a computer system 800 suitable for storing and/or executing a computer program in accordance with embodiments of the present invention. Computer system 800 includes a central processing unit 802 having at least one microprocessor. Central processing unit 802 can be coupled directly or indirectly to memory elements through system bus 812. The memory elements comprise computer-readable memory capable of storing computer-executable instructions. The memory elements can include random access memory 806 employed during the actual execution of the program code and non-volatile memory 810 for longer term storage of data and instructions.

One or more input devices 816 and output devices 818 can be coupled to system bus 812 either directly or through an intervening input/output (I/O) controller 814. Examples of input device 816 include, but are not limited to, a pointing device, such as a mouse or a trackpad, or a keyboard. Examples of output device 818 include, but are not limited to, a display screen or a printer. Input device 816 and output device 818 can be combined into a single device, for example, as a touchscreen comprising a display screen (for displaying output to the user of computer system 800) having a touch-sensitive surface (for receiving input from the user of computer system 800).

One or more network adapters 822 may also be coupled to computer system 800 to enable the system to become communicatively coupled to remote computer system 826 or remote printers or storage devices through intervening private or public networks 824. Modems, cable modems, Ethernet cards, and wireless network adapters are just a few of the currently available types of network adapters. Computer system 800 can include one or more receivers 830. Receiver 830 receives wireless signals via antenna 832. Receiver 830 is adapted for receiving a data signal from a transmitting device. Receiver 1130 can comprise a transceiver capable of both transmitting and receiving wireless data signals, including but not limited to, wireless local area networking, Wi-Fi, Bluetooth, cellular radio signals (GSM, CDMA, UMTS, LTE, etc.), global positioning system (GPS) signals, near field communication (NFC) signals, and the like. While various component devices of computer system 800 are shown as separate component devices in FIG. 8 for purposes of description, the various component devices may be integrated into a single device, as is known in the art, such as a system-on-a-chip (SoC) device.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A computer-implemented method for human artificial intelligence interaction (HAII) comprising:

displaying one or more suggested tasks to a user;

receiving a first input from the user, the first input indicating a selected suggested task from the one or more suggested tasks;

in response to receiving the first input from the user:

training a cognitive unit with the first input from the user so that the cognitive unit learns a bias of the user associated with the suggested task;

displaying to the user a predicted action associated with the selected suggested task, wherein a plurality of predicted actions are received from a plurality of global predictive models of a plurality of third-party systems, and the cognitive unit selects the predicted action to display to the user; and receiving a second input from the user, the second input indicating whether the predicted action is accepted by the user;

in response to the second input from the user indicating that the predicted action is accepted by the user:

training a cognitive unit with the second input from the user so that the cognitive unit learns the predicted action is acceptable to the user for the selected suggested task; and saving the suggested task and the predicted action in a task manager; and in response to the second input from the user indicating that the predicted action is not accepted by the user:

training a cognitive unit with the second input from the user so that the cognitive unit learns the predicted action is not acceptable to the user for the selected suggested task;

displaying one or more situationally suitable actions to the user, the situationally suitable actions prioritized by the cognitive unit; and receiving a third input from the user, the third input indicating a selected situationally suitable action from the one or more situationally suitable actions; and training a cognitive unit with the third input from the user so that the cognitive unit learns the selected situationally suitable action is acceptable to the user for the selected suggested task.

2. The computer-implemented method of claim 1, in which displaying one or more suggested tasks to a user includes:

receiving a trigger input, and displaying the one or more suggested tasks to a user based on the trigger input;

and training the cognitive unit with the trigger input.

3. The computer-implemented method of claim 1, in which displaying one or more suggested tasks to a user includes:

receiving a context, and displaying the one or more suggested tasks to a user based on the context;

and training the cognitive unit with the context.

4. The computer-implemented method of claim 1, in which the cognitive unit learns over time using reinforcement learning, on-line learning, or mini batches.

5. A computer system for human artificial intelligence interaction (HAII) comprising:
a computer processor; and
a computer-readable memory coupled to the computer processor, the computer-readable memory encoded with computer instructions that, when executed by the computer processor, cause the computer system to perform the steps of:
displaying one or more suggested tasks to a user;
receiving a first input from the user, the first input indicating a selected suggested task from the one or more suggested tasks;
in response to receiving the first input from the user:
training a cognitive unit with the first input from the user so that the cognitive unit learns a bias of the user associated with the suggested task;
displaying to the user a predicted action associated with the selected suggested task, wherein a plurality of predicted actions are received from a plurality of global predictive models of a plurality of third-party systems, and the cognitive unit selects the predicted action to display to the user; and
receiving a second input from the user, the second input indicating whether the predicted action is accepted by the user;
in response to the second input from the user indicating that the predicted action is accepted by the user:
training a cognitive unit with the second input from the user so that the cognitive unit learns the predicted action is acceptable to the user for the selected suggested task; and
saving the suggested task and the predicted action in a task manager; and
in response to the second input from the user indicating that the predicted action is not accepted by the user:
training a cognitive unit with the second input from the user so that the cognitive unit learns the predicted action is not acceptable to the user for the selected suggested task;
displaying one or more situationally suitable actions to the user, the situationally suitable actions prioritized by the cognitive unit; and
receiving a third input from the user, the third input indicating a selected situationally suitable action from the one or more situationally suitable actions;
training a cognitive unit with the third input from the user so that the cognitive unit learns the selected situationally suitable action is acceptable to the user for the selected suggested task.

6. The computer system of claim 5, in which the cognitive unit learns over time using reinforcement learning, on-line learning, or mini batches.

7. The computer system of claim 5, in which displaying one or more suggested tasks to a user includes:
receiving a trigger input, and
displaying the one or more suggested tasks to a user based on the trigger input;
and training the cognitive unit with the trigger input.

8. The computer system of claim 5, in which displaying one or more suggested tasks to a user includes:
receiving a context, and
displaying the one or more suggested tasks to a user based on the context;
and training the cognitive unit with the context.

9. A non-transitory computer-readable medium encoded with computer instructions for human artificial intelligence interaction (HAII), which when executed by a computer system, cause the computer system to perform the steps of:
displaying one or more suggested tasks to a user;
receiving a first input from the user, the first input indicating a selected suggested task from the one or more suggested tasks;
in response to receiving the first input from the user:
training a cognitive unit with the first input from the user so that the cognitive unit learns a bias of the user associated with the suggested task;
displaying to the user a predicted action associated with the selected suggested task, wherein a plurality of predicted actions are received from a plurality of global predictive models of a plurality of third-party systems, and the cognitive unit selects the predicted action to display to the user; and
receiving a second input from the user, the second input indicating whether the predicted action is accepted by the user;
in response to the second input from the user indicating that the predicted action is accepted by the user:
training a cognitive unit with the second input from the user so that the cognitive unit learns the predicted action is acceptable to the user for the selected suggested task; and
saving the suggested task and the predicted action in a task manager; and
in response to the second input from the user indicating that the predicted action is not accepted by the user:
training a cognitive unit with the second input from the user so that the cognitive unit learns the predicted action is not acceptable to the user for the selected suggested task;
displaying one or more situationally suitable actions to the user, the situationally suitable actions prioritized by the cognitive unit; and
receiving a third input from the user, the third input indicating a selected situationally suitable action from the one or more situationally suitable actions;
training a cognitive unit with the third input from the user so that the cognitive unit learns the selected situationally suitable action is acceptable to the user for the selected suggested task.

10. The non-transitory computer-readable medium of claim 9, in which displaying one or more suggested tasks to a user includes:
receiving a trigger input,
displaying the one or more suggested tasks to a user based on the trigger input;
and training the cognitive unit with the trigger input.

11. The non-transitory computer-readable medium of claim 9, in which displaying one or more suggested tasks to a user includes:
receiving a context, and
displaying the one or more suggested tasks to a user based on the context;
and training the cognitive unit with the context.

12. The non-transitory computer-readable medium of claim 9, in which the cognitive unit learns over time using reinforcement learning, on-line learning, or mini batches.

* * * * *